US012498263B2

(12) United States Patent
Han et al.

(10) Patent No.: US 12,498,263 B2
(45) Date of Patent: Dec. 16, 2025

(54) SNOW SUBLIMATION METER

(71) Applicant: Northwest Institute of Eco-Environment and Resources, Chinese Academy of Sciences, Lanzhou (CN)

(72) Inventors: Chuntan Han, Lanzhou (CN); Rensheng Chen, Lanzhou (CN); Yongping Shen, Lanzhou (CN); Yong Yang, Lanzhou (CN); Junfeng Liu, Lanzhou (CN); Zhangwen Liu, Lanzhou (CN); Xiqiang Wang, Lanzhou (CN); Shuhai Guo, Lanzhou (CN)

(73) Assignee: Northwest Institute of Eco-Environment and Resources, Chinese Academy of Sciences, Lanzhou (CN)

( * ) Notice: Subject to any disclaimer, the term of this patent is extended or adjusted under 35 U.S.C. 154(b) by 412 days.

(21) Appl. No.: 18/181,853

(22) Filed: Mar. 10, 2023

(65) Prior Publication Data
US 2023/0288245 A1    Sep. 14, 2023

(30) Foreign Application Priority Data

Mar. 14, 2022  (CN) .......................... 202210244143.1

(51) Int. Cl.
*G01G 23/16*        (2006.01)
*G01G 21/28*        (2006.01)
(52) U.S. Cl.
CPC ............. *G01G 23/16* (2013.01); *G01G 21/28* (2013.01)

(58) Field of Classification Search
CPC ........ G01G 23/16; G01G 21/28; G01G 19/00; G01G 17/04; G01W 1/14; G01N 2001/2873
(Continued)

(56) References Cited

U.S. PATENT DOCUMENTS

| 10,920,386 B2 * | 2/2021 | Gao ..................... G05D 1/6484 |
| 2010/0236272 A1 | 9/2010 | Yamamoto et al. |

FOREIGN PATENT DOCUMENTS

| CA | 2209116 A1 * | 12/1998 | ............. G01G 17/04 |
| CN | 2657019 Y    | 11/2004 | |

(Continued)

OTHER PUBLICATIONS

Chinese Office Action dated Apr. 20, 2022, in corresponding CN Patent Application No. 202210244143.1.

(Continued)

*Primary Examiner* — Jacques M Saint Surin
(74) *Attorney, Agent, or Firm* — LEYDIG, VOIT & MAYER, LTD.

(57) ABSTRACT

The present disclosure provides a snow sublimation meter, which includes a base, a snow storage tray, a weighing sensor and a snow cutting assembly. The base is used for supporting on the ground. The snow storage tray is provided with a snow storage tank, and the snow storage tray is connected with the base through a weighting sensor. The snow cutting assembly includes a reducer arm and a cutter, the reducer arm is connected to the base, the cutter is connected to the reducer arm, and the cutter is attached to the outer peripheral surface of the snow storage tray; and the reducer arm is used to drive the cutter to rotate around the snow storage tray to cut and separate the accumulated snow attached on the outer peripheral surface from the outer peripheral surface.

8 Claims, 3 Drawing Sheets

(58) Field of Classification Search
USPC .............................................................. 177/6
See application file for complete search history.

(56) References Cited

FOREIGN PATENT DOCUMENTS

| | | | |
|---|---|---|---|
| CN | 2684181 | Y | 3/2005 |
| CN | 101846423 | A | 9/2010 |
| CN | 201765164 | U | 3/2011 |
| CN | 102478476 | A | 5/2012 |
| CN | 104375215 | A | 2/2015 |
| CN | 105158110 | A | 12/2015 |
| CN | 206096111 | U | 4/2017 |
| CN | 206609984 | U | 11/2017 |
| CN | 206892365 | U | 1/2018 |
| CN | 208324304 | U | 1/2019 |
| CN | 208470718 | U | 2/2019 |
| CN | 210090707 | U | 2/2020 |
| CN | 210632073 | U | 5/2020 |
| CN | 211554363 | U | 9/2020 |
| CN | 217439373 | * | 9/2022 |
| JP | H10160860 | A | 6/1998 |
| JP | 3625654 | B2 * | 3/2005 |
| WO | WO 2017/188476 | A1 | 11/2017 |

OTHER PUBLICATIONS

Chinese Search dated Apr. 14, 2022, in corresponding CN Patent Application No. 202210244143.1.
Chinese Notice of Grant dated May 5, 2022, in corresponding CN Patent Application No. 202210244143.1.

* cited by examiner

SNOW SUBLIMATION METER

CROSS-REFERENCES TO RELATED APPLICATION

The present application claims priority to the Chinese patent application no. 2022102441431, entitled "Snow Sublimation Meter", filed with the Chinese Patent Office on Mar. 14, 2022, the entire contents of which are incorporated herein by reference.

TECHNICAL FIELD

The present disclosure relates to the field of environmental protection, in particular, relates to a snow sublimation meter (i.e., a meter for sublimation amount of the snow).

BACKGROUND OF THE INVENTION

Ice and snow, as an important part of the cryosphere, which have a distribution accounting for about 20% of the global area, have unique radiation and thermodynamic properties. Sublimation of ice and snow is a common hydrological phenomenon in areas covered by ice and snow, which is an important factor affecting regional and global hydrologic budget, energy balance and atmospheric circulation, and has an important impact on ecology, hydrology, geomorphology and climate. Therefore, it is considered an indicator of climate change. Under the background of global warming, the reduction of snowfall in winter and the advance of snowmelt period promote the sublimation of snow, which has a significant adverse impact on the utilization of water resources in the mountain watershed. Since the sublimation of ice and snow is highly unbalanced in time and space and the means and information for accurate forecasting are insufficient, accurately monitoring the sublimation of ice and snow is not only helpful to the understanding of regional water volume and energy balance, but also beneficial to manage regional water resource scientifically. Accumulated snow sublimation mainly includes sublimation of the accumulated snow on the earth's surface, canopy accumulated snow and wind blowing snow, and its observation methods mainly include the method by using evaporator or lysimeter, aerodynamic method, eddy correlation method and so on. The instrumental method is the most direct measurement method to determine the sublimation amount by measuring the difference value between two times of weighting of the snow container. According to the different structures of manual observation instruments for sublimation of ice and snow, the instrument used in the instrumental method includes snow container and lysimeter. Except for the obvious structural difference between these two instruments, snow container generally does not need to measure the volume of infiltrating melt water. The instrumental method can directly measure the sublimation of the surface of ice and snow. The structure of the observation instrument is relatively simple, the production cost is relatively low, and synchronously repeated observation in the adjacent area can be attained, so the instrumental method is widely used. Observing the amount of sublimation of ice and snow by using instrumental method needs to determine the suitable structure and size of snow container or lysimeter according to the actual situation, and select materials with similar thermal conductive characteristics of ice and snow to make the instruments.

The existing lysimeter has disadvantages found by inventor through research as follows.

1) When snowfall occurs in winter, the accumulated snow layer that thaws during the day and freezes at night is easy to form a snow crust, consequently the accumulated snow on the lysimeter will link with the surrounding accumulated snow, thereby the weight change measured by the weighting sensor cannot represent the amount of sublimation of the accumulated snow with the caliber size of the lysimeter, which makes the error of the measurement results very large and is inconvenient to use.
2) The existing lysimeter has a larger weighing range, but the sublimation amount of accumulated snow is smaller than the evapotranspiration amount of soil and vegetation, which requires higher accuracy and resolution of the lysimeter weighing system. Therefore, the present disclosure changes the soil column of the lysimeter into a snow storage tray, thereby reducing the measuring range of the weighting sensor and improving the accuracy of the weighting sensor.
3) Since the daily fluctuation of the ambient temperature has an impact on the weighing system, the present disclosure designs the snow storage tray to connect the weighting sensor and the base through a dowel bar, so that the weighting sensor is located at a depth of 40 cm below the ground surface, which can reduce the temperature drift of the weighting sensor due to ambient temperature.

SUMMARY OF THE INVENTION

The object of the present disclosure is to provide a snow sublimation meter, which can realize continuously automatic observation and is convenient and flexible to use.

Embodiments of the present disclosure are achieved as follows.

The present disclosure provides a snow sublimation meter, including:
a base;
a snow storage tray, wherein the snow storage tray is provided with a snow storage tank;
a weighting sensor, wherein the snow storage tray is connected to the base through the weighting sensor; and
a snow cutting assembly, wherein the snow cutting assembly includes a reducer arm and a cutter, the reducer arm is connected to the base, the cutter is connected to the reducer arm, and the cutter is attached to the outer peripheral surface of the snow storage tray; and the reducer arm is configured to drive the cutter to rotate around the snow storage tray, so as to cut and separate the accumulated snow attached on the outer peripheral surface from the outer peripheral surface.

In an optional embodiment, the base includes an outer cylinder and a first partition, the outer cylinder is configured to have one end closed and the other end opened, the first partition is connected to the outer cylinder and a gap is formed between the first partition and the bottom wall of the outer cylinder, wherein the first partition, the bottom wall and the inner peripheral wall of the outer cylinder jointly define a water storage chamber; the water storage chamber is equipped with a water pump; the opening of the snow storage tank is located on the same side as the open end of the outer cylinder, and the opening of the snow storage tank is higher than the open end of the outer cylinder; and the snow storage tray is located on the side of the first partition away from the bottom wall.

In an optional embodiment, the base further includes a second partition, the second partition is connected to the outer cylinder and is located on the side of the first partition away from the bottom wall; and the reducer arm is connected with the second partition.

In an optional embodiment, the base further includes a supporting foot and a dowel bar, the supporting foot is connected to the first partition, the dowel rod passes through the second partition, and the weighting sensor is arranged on the supporting foot; and the dowel bar has one end connected with the weighting sensor and the other end connected with the snow storage tray.

In an optional embodiment, the base further includes a tray, the tray is connected to the dowel bar, the snow storage tray and the tray is detachably connected to each other.

In an optional embodiment, the snow storage tray is coaxially arranged with the outer cylinder, a gap is formed between the outer peripheral surface of the snow storage tray and the inner peripheral surface of the outer cylinder to jointly define an annular space; the snow sublimation meter also includes an end cap, which is sleeved outside the outer cylinder and seals the annular space; the end cap cooperates with the outer cylinder rotatably around the axis of the outer cylinder; and the cutter is connected with the end cap.

In an optional embodiment, the cutter is provided with a snow-scraping surface and a snow-pushing surface that are connected, wherein the snow-scraping surface and the snow-pushing surface form an acute angle; the snow-scraping surface is attached and slidably connected to the outer peripheral surface of the snow storage tray; and the snow-pushing surface is used to guide the snow that is cut and separated outward along the radial direction of the snow storage tray.

In an optional embodiment, the cutter has opposite first end and second end, the height of the first end is lower than the height of the opening of the snow storage tank, and the height of the second end is higher than the height of the opening of the snow storage tank.

In an optional embodiment, the reducer arm includes a motor and a reducer, the motor is connected to the reducer, the reducer is connected to the cutter, and both the motor and the reducer are connected to the base.

In an optional embodiment, the reducer arm further includes a rotating plate and a connecting piece, the rotating plate is connected to the reducer, and the connecting piece is connected to the rotating plate and the cutter at the same time.

The beneficial effects of the embodiments of the present disclosure are as follows.

To sum up, the present embodiment provides a snow sublimation meter. When in use, the whole device is placed outdoors, and accumulated snow is automatically collected and stored by the snow storage tray. After the weight of the accumulated snow in the snow storage tray changes, the change can be captured directly through the weighting sensor, which obtains the change of the weight of the accumulated snow in real time and transmits it to the terminal, and the change of the accumulated snow is obtained via the terminal analysis. At the same time, due to the design of the cutter, the accuracy of the weight of accumulated snow measured by the weighting sensor is guaranteed, that is, the weight of accumulated snow measured by the weighting sensor is the exact weight of accumulated snow in the snow storage tray, accordingly the goal that the sublimation data of accumulated snow per unit area is collected is reached, and the data result is more accurate. That is to say, after the accumulated snow attached on the outer peripheral surface of the snow storage tray is cut and separated by the cutter, this part of the accumulated snow will not affect the measurement results of the weighting sensor, and at the same time, the accumulated snow will not continuously cover the connection position between the snow storage tray and the base, and the weighting sensor damaged by a large amount of snow accumulation will not happen, thereby the observation is safer.

BRIEF DESCRIPTION OF DRAWINGS

In order to illustrate the technical solutions of the embodiments of the present disclosure more clearly, the drawings used in the embodiments will be briefly introduced below. It should be understood that the following drawings only show some embodiments of the present disclosure, and thus should not be regarded as a limitation on the scope, and those of ordinary skill in the art can also obtain other related drawings based on these drawings without inventive effort.

REFERENCE NUMERALS

Figure 1:
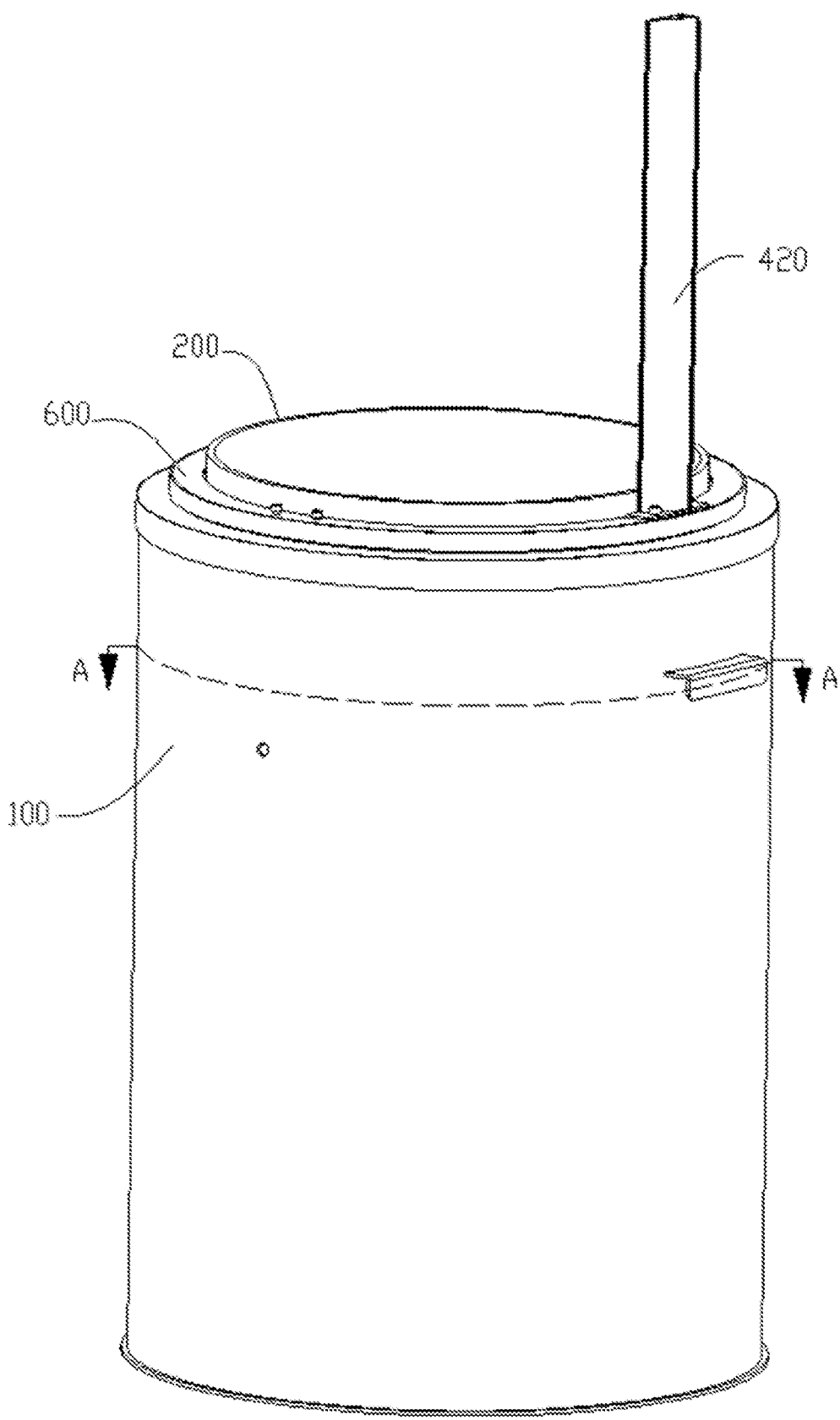
FIG. 1 is the structural schematic view of the snow sublimation meter according to the embodiment of the present disclosure.

100—base; 110—outer cylinder; 120—first partition; 130—second partition; 140—supporting foot; 150—dowel bar; 160—tray; 170—water storage chamber; 200—snow storage tray; 300—weighting sensor; 400—snow cutting assembly; 410—reducer arm; 411—motor; 412—reducer; 413—rotating plate; 414—connecting piece; 415—microcontroller; 420—cutter; 421—snow-pushing surface; 500—water pump; 600—end cap.

DETAILED DESCRIPTION OF THE INVENTION

In order to make the purpose, technical solutions and advantages of the embodiments of the present disclosure clearer, the technical solutions in the embodiments of the present disclosure will be clearly and completely described below in conjunction with the drawings in the embodiments of the present disclosure. Obviously, the described embodiments are a part of embodiments of the present disclosure, rather than all embodiments. The components of the embodiments of the present disclosure generally described and shown in the drawings herein may be arranged and designed in a variety of different configurations.

Accordingly, the following detailed description of the embodiments of the present disclosure provided in the drawings is not intended to limit the scope of the present disclosure, but merely represents selected embodiments of the present disclosure. Based on the embodiments of the present disclosure, all other embodiments obtained by persons of ordinary skill in the art without inventive efforts fall within the protection scope of the present disclosure.

It should be noted that similar numerals and letters denote similar items in the following drawings, therefore, once an item is defined in one figure, further definition and explanation in subsequent drawings is not required.

In the description of the present disclosure, it should be noted that the terms "center", "up", "low", "left", "right", "vertical", "horizontal", "inner", "outer" etc. indicate the orientation or positional relationship based on the orientation or positional relationship shown in the drawings, or the orientation or positional relationship where the product of the present disclosure is usually placed when being used; and it is only for the convenience of describing the present disclosure and simplifying the description, rather than indicating or implying that the devices or elements referred must be in a particular orientation or be constructed and operated in a particular orientation, therefore, it should not be construed as limitation of the present disclosure. In addition, the terms "first", "second", "third", etc. are only used for distinguishing descriptions, and should not be construed as indicating or implying relative importance.

Furthermore, the terms "horizontal", "vertical" and so on do not imply that a component is absolute horizontal or overhanging, but may be slightly inclined. For example, "horizontal" only means that its direction is more horizontal than "vertical", and does not mean that the structure must be completely horizontal, but can be slightly inclined.

In the description of the present disclosure, it should also be noted that unless otherwise clearly specified and limited, the terms "provide", "install", "link" and "connect" should be understood in a broad sense, for example, it may be a fixed connection, a detachable connection or an integral connection; it can be a mechanical connection or an electrical connection; and it can be a direct connection or an indirect connection through an intermediary, and it can be the internal communication between two components. Those of ordinary skill in the art can understand the specific meanings of the above terms in the present disclosure in specific situations.

In the prior art, when the lysimeter is used to observe the sublimation of accumulated snow, since the snow will continuously accumulated on the observation system during the observation process, the weighting portion and base portion of the observation system are both covered with accumulated snow; after the snow is frozen, the weight of the accumulated snow on the base portion is also obtained by the weighing portion, thus the accuracy of the data obtained by observation is poor. At the same time, when the accumulated snow is thick, the weighing portion will be crushed, which causes a loss.

In view of this, the designer designed a snow sublimation meter, which can realize continuously automatic detection, and has high accuracy of monitoring data and high application value.

Figure 2:
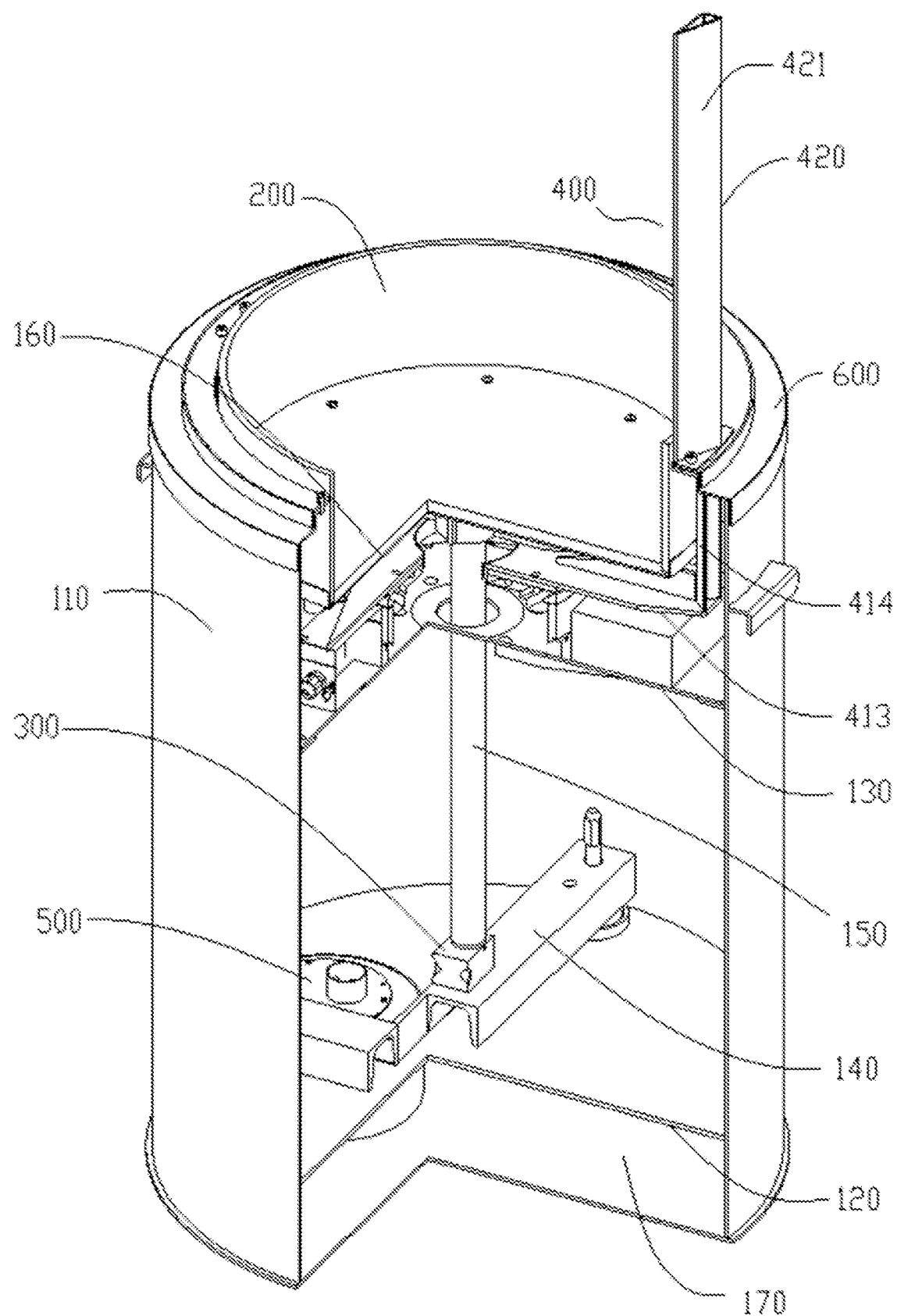
FIG. 2 is a schematic view of partially sectional structure of a snow sublimation meter according to the embodiment of the present disclosure.
Figure 3:
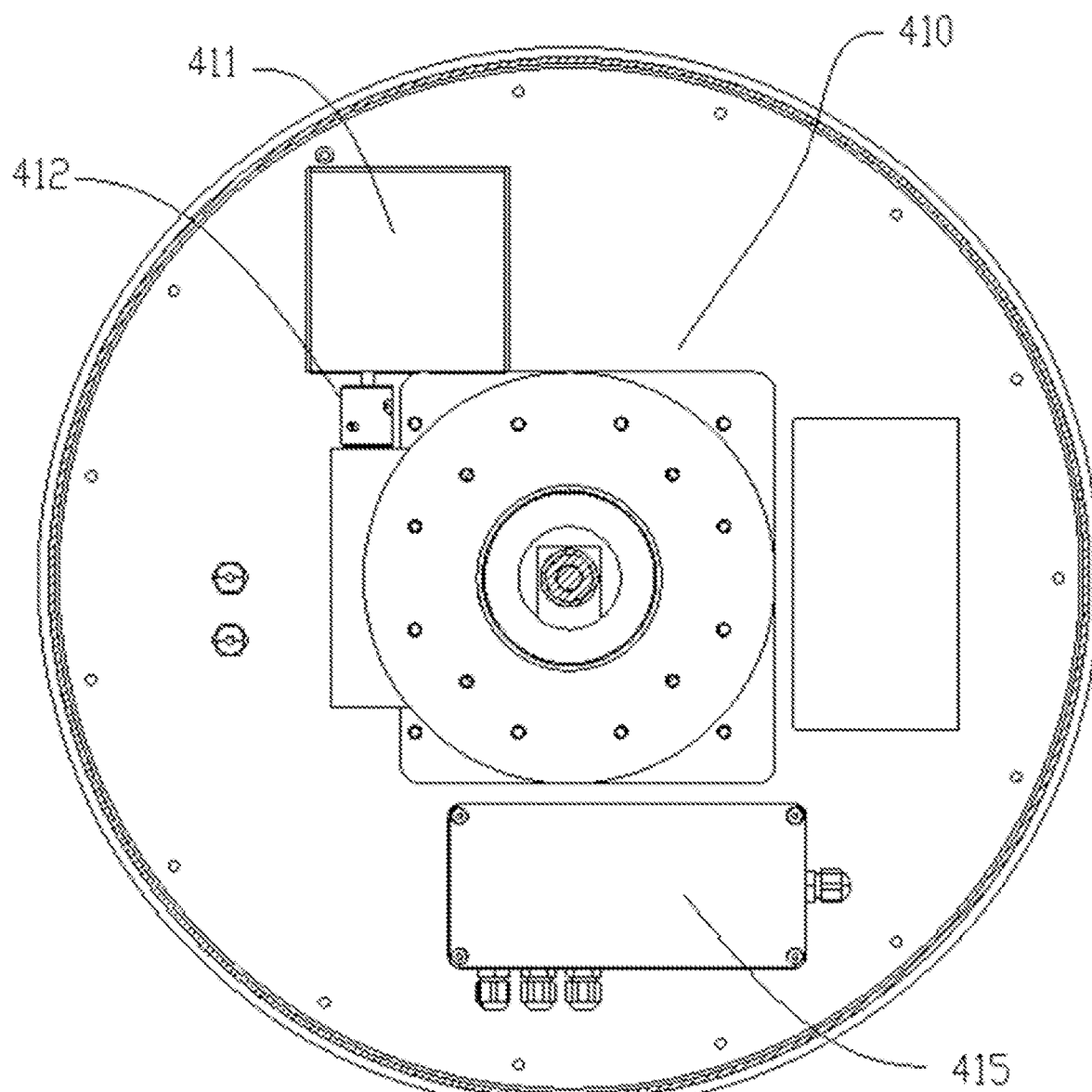
FIG. 3 is a schematic view of a longitudinally sectional structure at A-A shown in FIG. 1.

Referring to FIG. 1-FIG. 3, in this embodiment, the snow sublimation meter includes a base 100, a snow storage tray 200, a weighting sensor 300 and a snow cutting assembly 400. The base 100 is configured for supporting on the ground. The snow storage tray 200 is provided with a snow storage tank, and the snow storage tray 200 is connected to the base 100 through a weighting sensor 300. The weighting sensor 300 can obtain the weight of the snow storage tray 200 and accumulated snow, and can transmit the weight parameters to the background terminal in real time. By storing, calculation and analysis through the background terminal, the data related to accumulated snow sublimation is finally obtained. The snow cutting assembly 400 includes a reducer arm 410 and a cutter 420, the reducer arm 410 is connected to the base 100, the cutter 420 is connected to the reducer arm 410, and the cutter 420 is attached to the outer peripheral surface of the snow storage tray 200; and the reducer arm 410 is configured to drive the cutter 420 to rotate around the snow storage tray 200, thereby the accumulated snow attached to the outer peripheral surface is cut and separated.

The snow sublimation meter provided in this embodiment includes, for example, the following using mode.

When in use, the whole device is arranged outdoors, and the snow storage tray 200 is used to collect and store the accumulated snow. After the weight of the accumulated snow in the snow storage tray 200 changes, the change can be obtained directly through the weighting sensor 300. The weighting sensor 300 obtains the change of the weight of the accumulated snow in real time and transmits it to the terminal, and the change of the accumulated snow is obtained through the terminal analysis. At the same time, due to the design of the cutter 420, the accuracy of the weight of accumulated snow measured by the weighting sensor 300 is guaranteed, that is, the accumulated snow weight measured by the weighting sensor 300 is exactly the weight of accumulated snow in the snow storage tray 200, thereby achieving the purpose of collecting the sublimation data of the unit area of accumulated snow, which has more accurate data result. That is to say, after the accumulated snow attached to the outer peripheral surface of the snow storage tray 200 is cut and separated by the cutter 420, this part of accumulated snow is separated from the accumulated snow located in the snow storage tray 200, which will not affect the measurement result of the weighting sensor 300. At the same time, the accumulated snow will not continue to cover the connecting position between the snow storage tray 200 and the base 100, and the weighting sensor 300 damaged by a large amount of snow accumulation will not happen, thereby the observation is safer.

Referring to FIG. 2, in this embodiment, optionally, the base 100 includes an outer cylinder 110, a first partition 120, a second partition 130, a supporting foot 140, a dowel bar 150 and a tray 160. The outer cylinder 110 is configured as a cylinder, the bottom of the outer cylinder 110 is sealed and its top is open. Both the first partition 120 and the second partition 130 are circular plates, the first partition 120 and the second partition 130 are both arranged in the outer cylinder 110, and the first partition 120 is closer to the bottom of the outer cylinder 110 than the second partition 130. The first partition 120 and the second partition 130 can be fixed on the outer cylinder 110 by means of welding, bonding or screws. Specifically, the outer peripheral surface of the first partition 120 is attached to the inner wall of the outer cylinder 110, the outer peripheral surface of the second partition 130 is attached to the inner wall of the outer cylinder 110, and a gap is formed between the first partition 120 and the second partition 130 in the extension direction of the axis of outer cylinder 110. The gap is provided between the first partition 120 and the bottom wall of the outer cylinder 110, the first partition 120 and the outer cylinder 110 together define a water storage chamber 170. That is to say, the plate surface of the first partition 120 away from the second partition 130, part of the inner peripheral wall of the outer cylinder 110 and the inner bottom wall of the outer cylinder 110 jointly define the water storage chamber 170. The water storage chamber 170 is provided with a water pump 500, and the water outlet of the water pump 500 is located outside the water storage chamber 170. For example, the water outlet of the water pump 500 is communicated with a water pipe, and the water pipe runs through the peripheral wall of the outer cylinder 110. In this way, when a larger amount of the water is stored in the water storage chamber 170, the water pump 500 is started to pump out the water in the water storage chamber 170. It should be understood that a water level gauge can be set in the water storage chamber 170, the water level gauge is in communicational connection to the controller of the water pump 500, and the water level gauge is configured to detect the highest water level of the water storage chamber 170. When the highest water level in the water storage chamber 170 is detected to reach the preset value, the water level gauge transmits a signal to the controller, and the controller controls the water pump 500 to start, consequently realizing the water pumping operation. An accommodating chamber is formed between the first partition 120 and the second partition 130, and the supporting foot 140 and the dowel bar 150 are located in the accommodating chamber. Specifically, the supporting foot 140 is set as a tripod, the supporting foot 140 is connected with the first partition 120, and the height and horizontal position of the supporting foot 140 can be adjusted relative to the first partition 120. The dowel bar 150 is connected to the supporting foot 140, and a weighting sensor 300 is arranged between the two. Specifically, the dowel bar 150 is a cylindrical rod, the dowel bar 150 passes through the second partition 130, and the dowel bar 150 is in clearance fit with the second partition 130. By adjusting the position of the supporting foot 140 relative to the first partition 120, the position of the dowel bar 150 can be adjusted, such that the dowel bar 150, the first partition 120, the second partition 130 and the outer cylinder 110 are arranged coaxially.

Optionally, the tray 160 is configured as a round plate, the tray 160 is fixedly connected to the end of the dowel bar 150 away from the supporting foot 140 and both of them are arranged coaxially. The snow storage tray 200 is disposed on the tray 160, and the weight of the snow storage tray 200 and the accumulated snow can be transmitted to the weighting sensor 300 through the tray 160 and the dowel bar 150. After the assembly is completed, the tray 160 is the side of the second partition 130 away from the first partition 120.

In this embodiment, optionally, the snow sublimation meter further includes an end cap 600, the end cap 600 is sleeved over the open end of the outer cylinder 110, and the end cap 600 and the outer cylinder 110 are rotatably connected around the axis of the outer cylinder 110. The end cap 600 is provided with a through hole, and the snow storage tray 200 passes through and provided in the through hole and is connected with the tray 160. At the same time, the end cap 600, the outer cylinder 110, the tray 160 and the snow storage tray 200 are coaxially arranged.

In this embodiment, optionally, the snow storage tray 200 is provided with a snow storage tank for collecting the accumulated snow, and further, the snow storage tank is configured as a round tank. The snow storage tray 200 is installed in the through hole of the end cap 600, and the bottom wall of the tank of the snow storage tray 200 is attached to the tray 160. The opening of the snow storage tray 200 is higher than the end cap 600. The opening of the snow storage tray 200 faces away from the tray 160. That is to say, during the data collection process, snowflakes enter the snow storage tray 200 from the opening of the snow storage tray 200 and are stored in the snow storage tray 200. Moreover, the end cap 600 can rotate relative to the snow storage tray 200.

Referring to FIG. 2 and FIG. 3, in this embodiment, optionally, the reducer arm 410 includes a microcontroller 415, a motor 411, a reducer 412, a rotating plate 413 and a connecting piece 414. Both the motor 411 and the reducer 412 are fixed on the side of the second partition 130 away from the first partition 120 and are both electrically connected to the microcontroller 415. The output shaft of the motor 411 is connected to the input portion of the reducer 412, and the input portion of the reducer 412 is connected to the rotating plate 413. The rotating plate 413 is sleeved outside the dowel bar 150 and is located between the snow storage tray 200 and the second partition 130. The rotating plate 413 is connected to the end cap 600 through the connecting piece 414, and the cutter 420 is installed on the end cap 600. In this way, after the motor 411 is started, the torque is transmitted to the rotating plate 413 through the reducer 412, and the rotating plate 413 drives the end cap 600 to rotate through the connecting piece 414, and further drives the cutter 420 to rotate, such that the accumulated snow on the outer circumferential surface of the snow storage tray 200 is scraped off by the cutter 420, which prevents the accumulated snow stored in the snow storage tray 200 from being linked with the accumulated snow on the end cap 600 and the outer cylinder 110 to affect the measurement results.

It should be noted that the cutter 420 may be fixed on the end cap 600 by bolts. Moreover, the cutter 420 protrudes from the opening of the snow storage tray 200 in the axially extending direction of the outer cylinder 110. That is to say, the height of the end of the cutter 420 away from the outer cylinder 110 is higher than the height of the opening of the snow storage tray 200, and the height of the cutter 420 is higher than the height of the snow stored in the snow storage tray 200 during the test, so that the cutter 420 can always rotate around the snow storage tray 200 to scrape off the accumulated snow on the outer wall of the snow storage tray 200.

In this embodiment, optionally, the cutter 420 includes a first side plate, a second side plate and a third side plate that are connected end to end in sequence, that is to say, the cutter 420 is roughly of a triangular prism structure. The outer surface of the first side plate is a snow-scraping surface, the outer surface of the second side plate is a snow-pushing surface 421, the snow-scraping surface and the snow-pushing surface 421 form an acute angle, and the connection position between these two is formed as a blade. During assembly, the snow-scraping surface of the cutter 420 is attached to the outer peripheral surface of the snow storage tray 200, and the cutter 420 can be driven by the reducer arm 410 to rotate around the snow storage tray 200, such that the accumulated snow is cut by the blade, and the accumulated snow around the outer peripheral surface of snow storage tray 200 is scraped off by the snow-scraping surface. After the accumulated snow is scraped off from the snow storage tray 200, under the guidance of the snow-pushing surface 421, the accumulated snow slides down toward the direction away from the snow storage tray 200, thus the scraped accumulated snow is further away from the snow storage tray 200, and will not enter the snow storage tray 200.

When the snow sublimation meter provided in this embodiment is carrying out the sublimation test for the accumulated snow, the gauge is placed in the external environment, the snow storage tray 200 can store accumulated snow, and the weight of the accumulated snow is obtained by detection by the weighting sensor 300 in real time. The weighting sensor 300 transmits the detection result to the terminal, and the terminal and the weighting sensor 300 can be wiredly or wirelessly connected. The terminal can acquire and process weight data in real time, so as to analyze and obtain the law of the accumulated snow sublimation. During the test, the accumulated snow on the outer peripheral surface of the snow storage tray 200 is cut and separated by the cutter 420, that is to say, the weighting sensor 300 only monitors the weight change of the accumulated snow on the snow storage tray 200, and the weight data of the accumulated snow obtained by the weighting sensor 300 is more accurate, and thus the sublimation test is more accurate and reliable.

The above descriptions are only preferred embodiments of the present disclosure, and are not intended to limit the present disclosure. For those skilled in the art, the present disclosure may have various modifications and changes. Any modifications, equivalent replacements, improvements, etc. made within the spirit and principle of the present disclosure shall be included within the protection scope of the present disclosure.

When a group of materials, compositions, components or compounds is disclosed herein, it is understood that all individual members of those groups and all subgroups thereof are disclosed separately. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

What is claimed is:

1. A snow sublimation meter, wherein the snow sublimation meter comprises:

a base, wherein the base comprises an outer cylinder and a first partition, the outer cylinder is configured to have one end closed and the other end opened, the first partition and the outer cylinder are connected and a gap is formed between the first partition and a bottom wall of the outer cylinder, wherein the first partition, the bottom wall and an inner peripheral wall of the outer cylinder together define a water storage chamber, and wherein a water pump is provided in the water storage chamber;

a snow storage tray, wherein the snow storage tray is provided with a snow storage tank, an opening of the snow storage tank is located on the same side as an open end of the outer cylinder, the opening of the snow storage tank is higher than the open end of the outer cylinder, and the snow storage tray is located at a side of the first partition away from the bottom wall, wherein the snow storage tray is arranged coaxially with the outer cylinder, and a gap is formed between the outer peripheral surface of the snow storage tray and the inner peripheral surface of the outer cylinder, so as to define an annular space together; wherein the snow sublimation meter further comprises an end cover, and the end cap is sleeved outside the outer cylinder and seals the annular space; and wherein the end cap rotatably cooperates with the outer cylinder around an axis of the outer cylinder;

a weighting sensor, wherein the snow storage tray is connected to the base through the weighting sensor; and a snow cutting assembly, wherein the snow cutting assembly comprises a reducer arm and a cutter, the reducer arm is connected to the base, the cutter is connected to the reducer arm through the end cap, and the cutter is attached to an outer peripheral surface of the snow storage tray; and the reducer arm is configured to drive the cutter to rotate around the snow storage tray, so as to cut and separate the accumulated snow attached on the outer peripheral surface from the outer peripheral surface.

2. The snow sublimation meter according to claim 1, wherein the base further comprises a second partition, the second partition is connected to the outer cylinder and is located at the side of the first partition away from the bottom wall; and the reducer arm is connected to the second partition.

3. The snow sublimation meter according to claim 2, wherein the base further comprises a supporting foot and a dowel bar, the supporting foot is connected with the first partition, and the dowel bar runs through the second partition, and the weighting sensor is arranged on the supporting foot; and the dowel bar has one end connected to the weighting sensor and the other end connected with the snow storage tray.

4. The snow sublimation meter according to claim 3, wherein the base further comprises a tray, the tray is connected to the dowel bar, and the snow storage tray is detachably connected to the tray.

5. The snow sublimation meter according to claim 1, wherein the cutter is provided with a snow-scraping surface and a snow-pushing surface that are connected with each other, and the snow-scraping surface and the snow-pushing surface form an acute angle; the snow-scraping surface is attached and slidably connected to the outer peripheral surface of the snow storage tray; and the snow-pushing surface is configured to guide snow that is cut and separated outward along a radial direction of the snow storage tray.

6. The snow sublimation meter according to claim 1, wherein the cutter has a first end and a second end which are opposite to each other, a height of the first end is lower than a height of the opening of the snow storage tank, and a height of the second end is higher than the height of the opening of the snow storage tank.

7. The snow sublimation meter according to claim 1, wherein the reducer arm comprises a motor and a reducer, the motor is connected to the reducer, and the reducer is connected to the cutter; and the motor and the reducer are both connected to the base.

8. The snow sublimation meter according to claim 7, wherein the reducer arm also comprises a rotating plate and a connecting piece, the rotating plate is connected to the reducer, and the connecting piece is connected to both the rotating plate and the cutter.

* * * * *